Aug. 3, 1965     L. PÉRAS     3,198,025
AUTOMATIC CHAIN TENSIONING DEVICES
Filed May 21, 1963

*INVENTOR*
LUCIEN PÉRAS

BY *Stevens, Davis, Miller + Mosher*
*ATTORNEYS*

United States Patent Office 3,198,025
Patented Aug. 3, 1965

3,198,025
AUTOMATIC CHAIN TENSIONING DEVICES
Lucien Péras, Billancourt, France, assignor to Regie Nationale des Usines Renault, Billancourt, France
Filed May 21, 1963, Ser. No. 281,900
Claims priority, application France, Nov. 18, 1959, 810,510, Patent 1,249,477
3 Claims. (Cl. 74—242.11)

This application is a continuation-in-part of my copending application Serial No. 68,779 filed November 14, 1960, now U.S. Patent No. 3,111,039.

The present invention relates in general to chain tensioners of the type used more particularly for the valve timing of internal combustion engines, and has specific reference to improvements in self-adjusting or automatic tensioners which consist in providing simple constructional characteristics with a view to reduce manufacturing costs and improve the reliability of these devices. These improvements consist essentially in mounting on the cylinder block a support carrying a friction shoe or pressure member engaging the slack or idle span of the chain, said support being pivotally mounted with its pivot axis located very close to the camshaft wheel, whereby a practically reasonable inclination of the residual slack span may be preserved to permit the use of vibration dampers, the tensioner support being urged against the chain by a hydraulic piston or a spring and comprising a non-recoil device.

In order to afford a clearer understanding of this invention and of the manner in which the same may be embodied in practice, reference will now be made to the accompanying drawings illustrating diagrammatically by way of example one embodiment of the chain tensioning device constituting the subject-matter of this invention.

Figure 1:
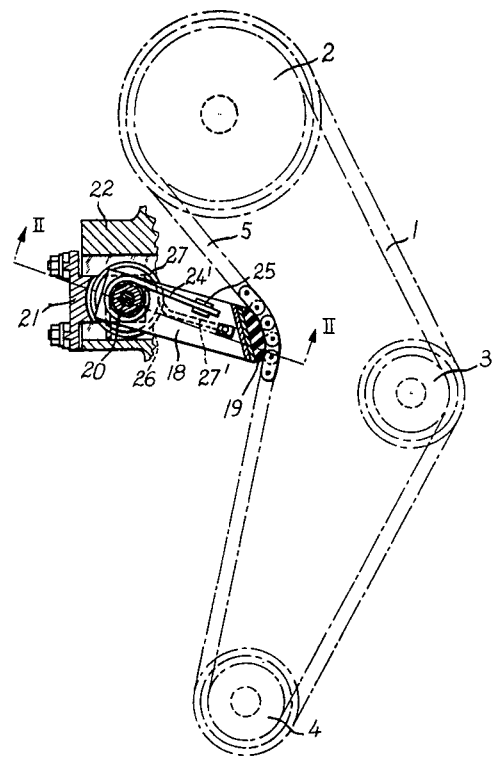
FIGURE 1 is a fragmentary side elevational and part-sectional view showing a chain tensioning device constructed according to the teachings of this invention.
Figure 2:
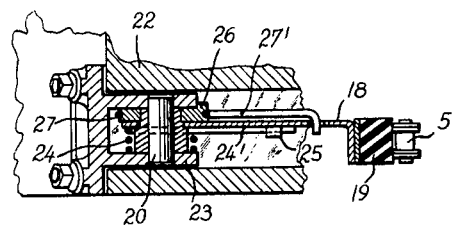
FIGURE 2 is a section taken on a larger scale upon the line AB of FIGURE 1, showing a modified embodiment of the device of this invention.

Referring to FIGS. 1 and 2 of the drawings, the timing chain 1 of this example passes over toothed wheels or sprockets 2, 3, 4, wheel 2 driving the overhead camshaft of the engine (not shown). Mounted on the slack or idle span 5 of the chain is a tensioning device consisting of an arm 18 receiving the friction pad 19 engaging the slack span 5; this arm consists of a cut and pressed steel sheet element pivotally mounted with the interposition of a socket 23 on a pivot pin 20 carried in turn by a strap 21 secured in any suitable manner on the cylinder block 22. Mounted on the socket 23 surrounding the pivot pin 20 between the arms of the strap 21 is a tension spring 24 having one end secured on the strap and its opposite end formed with a straight extension $24^1$ threaded in an eyelet or collar 25 of arm 18. On the other hand, a washer or disc 26 formed with a peripheral groove is secured on the socket 23 and receives a non-return or non-recoil spring consisting of a loop 27 wound in the groove of washer 26 and formed with a straight portion $27^1$ of which the outer end is bent at right angles and hooked through the arm 18.

The length of the arm 18 is such and its pivot pin 20 is located sufficiently close to the camshaft wheel 2, that a practically constant inclination of a rectilinear portion of the residual slack span 5 with respect to the position of the sprocket wheels may be obtained, said constant inclination permitting the adaptation of a very simple type of not shown vibration dampers.

This tensioning device operates as follows:

The self-adjusting characteristic is given by the tension spring 24 exerting a light pressure exceeding however the opening tension of the non-recoil spring 27 slidably engaging the groove of the supporting washer 26.

Any backward movements of the arm 18, as a consequence of the chain jolting and whipping movements, are prevented by the non-recoil spring 27 which, due to its frictional engagement with the groove of washer 26 and to its elastic pressure, will be locked instantaneously in the groove of the supporting washer rigid with the strap 21.

The flexibility of the right-hand portion $27^1$ of the non-recoil spring 27 will accommodate any thermal expansion effects of the engine and thus eliminate any risk of overloading the chain.

The chain tensioning device is secured in a lateral aperture of the cylinder head or of the cylinder block. Due to its reduced dimensions in the transverse direction this device can be extracted through this aperture by simply removing the supporting strap 21, without interfering with the chain mounting.

By properly selecting the length of the arm 18 and the position of the pivot axis, a practically constant inclination of the straight portion of the residual slack span of the chain may be obtained, which is particularly advantageous when the fitting of a vibration damper of relatively simple design is contemplated.

The non-recoil spring is simpler than conventional devices utilized for the same purpose, such as hydraulic pistons or racks.

The above-described chain tensioning device is characterized by many advantages with respect to the hitherto known devices. It constitutes a self-contained self-adjusting tensioner comprising only simple, easy-to-mount mechanical component elements, ensuring a satisfactory tensioning action free of any maintenance and therefore highly reliable. Except for the normal wear of the rubber friction pad, the wear-and-tear factor of the other parts of the device is practically negligible.

A regular oil splash on the pivot pin is sufficient to ensure a long useful life thereof.

If desired, a rubber roller formed with an adequate guiding section, or a toothed sprocket, both rotatively mounted on the free end of the arm 18, may be substituted for the rubber pad illustrated.

Of course, many modifications and alterations may be brought to the form of embodiment shown and illustrated herein by way of example, without departing however from the spirit and scope of the invention as set forth in the appended claims.

I claim:

1. In combination, sprocket wheels of an internal combustion engine including a camshaft sprocket wheel, a timing chain rotatably carried by said wheels and driving said camshaft sprocket wheel, a cylinder block, a pivot pin extending parallel to the camshaft sprocket wheel axis and disposed on a strap member detachably connected to said cylinder block, an elongated support member having one end pivotally connected to said pivot pin, a pressure member on the other end of said support member, said timing chain having a slack portion, said pressure member being disposed to contact and engage said slack portion of said chain, tensioning means mounted on said strap member and acting on said pressure member to maintain it in contact with the chain as it moves thereby, said pivot pin, said support member and said tensioning means being mounted with said strap member in a lateral recess of said cylinder block, the pivot pin axis being located on said cylinder block with respect to said sprocket wheels and to the pressure member so a rectilinear portion of said slack portion remains in constant inclination with respect to said cylinder block and to said sprocket wheels, and said recess being of a sufficient dimension to permit removal of the chain tensioning means from the outside of said cylinder block through said recess.

2. In combination, sprocket wheels of an internal combustion engine including a camshaft sprocket wheel, a timing chain rotatably carried by said wheels and driving said camshaft sprocket wheel, a cylinder block, a pivot pin extending parallel to the camshaft sprocket wheel axis and disposed on a strap member detachably connected to said cylinder block, an elongated support member having one end pivotally connected to said pivot pin and being mounted with said strap member in a lateral recess in said cylinder block, a pressure member on the other end of said support member, said timing chain having a slack portion, said pressure member being disposed to contact and engage the slack portion of said chain, tensioning means acting on said pressure member to maintain it in contact with the chain as it moves thereby, said tensioning means including a tension spring surrounding the pivot pin and having an extension on one end connected to said support member, the pivot pin axis being located on said cylinder block with respect to said sprocket wheels and to the pressure member so a rectilinear portion of said slack portion remains in constant inclination with respect to said cylinder block and to said sprocket wheels, and said recess being of a sufficient dimension to permit removal of the chain tensioning means from the outside of said cylinder block through said recess.

3. In combination, sprocket wheel of an internal combustion engine including a camshaft sprocket wheel, a timing chain rotatably carried by said wheels and driving said camshaft sprocket wheel, a cylinder block, a pivot pin extending parallel to the camshaft sprocket wheel axis and disposed on a strap member detachably connected to said cylinder block, an elongated support member having one end pivotally connected to said pivot pin and being mounted with said strap member in a lateral recess in said cylinder block, a pressure member on the other end of said support member, said timing chain having a slack portion, said pressure member being disposed to contact and engage the slack portion of said chain, said support member including a rod, a tensioning spring surrounding the pivot pin and having an extension on one end connected to said rod, a washer member with a peripheral groove mounted on said pivot pin, a non-recoil means having a loop slidably disposed in said peripheral groove and having a free extension connected to said rod whereby when said tension spring acts on said slack portion of the chain, said loop slides in said peripheral groove to prevent recoil of the rod by friction and by bracing, the pivot pin axis being located on said cylinder block with respect to said sprocket wheels and to the pressure member so a rectilinear portion of said slack portion remains in constant inclination with respect to said cylinder block and to said sprocket wheels, and said recess being of a sufficient dimension to permit removal of the chain tensioning means from the outside of said cylinder block through said recess.

References Cited by the Examiner
UNITED STATES PATENTS

| | | | |
|---|---|---|---|
| 2,575,313 | 11/51 | Covert et al. | 74—242.11 |
| 2,663,195 | 12/53 | Horan | 74—242.11 |
| 2,766,634 | 10/56 | Frank | 74—240 |

DON A. WAITE, *Primary Examiner.*